United States Patent
Robinson

(10) Patent No.: US 10,690,089 B2
(45) Date of Patent: Jun. 23, 2020

(54) TRREN EXHAUST NOZZLE-M-SPIKE TURBO RAM ROCKET

(71) Applicant: John J Robinson, Pittsburg, CA (US)

(72) Inventor: John J Robinson, Pittsburg, CA (US)

( * ) Notice: Subject to any disclaimer, the term of this patent is extended or adjusted under 35 U.S.C. 154(b) by 13 days.

(21) Appl. No.: 15/682,583

(22) Filed: Aug. 22, 2017

(65) Prior Publication Data
US 2019/0063372 A1    Feb. 28, 2019

(51) Int. Cl.
| | |
|---|---|
| *F02K 9/78* | (2006.01) |
| *F02K 7/18* | (2006.01) |
| *F02K 9/62* | (2006.01) |
| *F02K 9/97* | (2006.01) |
| *B64G 1/40* | (2006.01) |
| *B64G 1/00* | (2006.01) |

(52) U.S. Cl.
CPC ............... *F02K 9/78* (2013.01); *B64G 1/401* (2013.01); *F02K 7/18* (2013.01); *F02K 9/62* (2013.01); *F02K 9/97* (2013.01); *B64G 1/005* (2013.01); *F05D 2220/10* (2013.01); *F05D 2220/80* (2013.01); *F05D 2240/128* (2013.01); *F05D 2250/72* (2013.01); *F05D 2250/75* (2013.01)

(58) Field of Classification Search
CPC .......... B64G 1/005; B64G 1/401; F02K 7/18; F02K 9/62; F02K 9/78; F02K 9/97; F02K 7/10; F02K 7/105; F02K 7/14; F02K 7/16; F02K 7/20; F02K 9/74; F02K 9/76; F05D 2220/10; F05D 2220/80; F05D 2240/128; F05D 2250/72; F05D 2250/75; F02L 7/12

USPC .................. 244/171.1; 60/767, 768, 769
See application file for complete search history.

(56) References Cited

U.S. PATENT DOCUMENTS

| | | | | |
|---|---|---|---|---|
| 2,955,414 | A * | 10/1960 | Hausmann | F02K 7/16 60/244 |
| 3,279,187 | A * | 10/1966 | Lindman | F02K 7/105 60/245 |
| 3,430,445 | A * | 3/1969 | Smith, Jr. | F02K 7/105 60/245 |
| 3,938,328 | A * | 2/1976 | Klees | F02K 3/04 60/262 |
| 5,054,288 | A * | 10/1991 | Salemann | F02K 3/075 60/244 |
| 6,293,091 | B1 * | 9/2001 | Seymour | F02K 1/008 60/225 |
| 9,109,539 | B2 * | 8/2015 | Duge | F02K 3/02 |
| 2009/0113873 | A1 * | 5/2009 | Tweeton | F02K 5/00 60/246 |

(Continued)

Primary Examiner — William V Gilbert

(57) ABSTRACT

An engine system that produces all required thrust for an aerospace vehicle from takeoff through space operation utilizing a turbo ram rocket exhaust nozzle and M-Spike rocket consisting of airbreathing and non-airbreathing propulsion apparatuses. The airbreathing system consists of a turbine engine, a ramjet or scramjet, and the non-airbreathing system is a rocket motor. The turbine engine consists of a turbojet or turbofan configuration. The air breathing turbine, ramjet or scramjet feature an air inlet mechanism, and combustion fuel. The non-airbreathing rocket system includes separate oxidizer system, and either a separate or same source of combustion fuel as the turbine. Airflow velocities in the turbine bypass duct, and burner system, include subsonic and supersonic velocities for ramjet or scramjet operation. The rocket engine utilize either cryogenic or a non-cryogenic fuel and oxidizer system.

9 Claims, 6 Drawing Sheets

(56) References Cited

U.S. PATENT DOCUMENTS

| | | | |
|---|---|---|---|
| 2015/0007549 A1* | 1/2015 | Bossard | F02K 9/78 60/204 |
| 2016/0010565 A9* | 1/2016 | Kohlenberg | F04D 29/522 60/805 |
| 2016/0326986 A1* | 11/2016 | Laforest | F02K 7/18 |

* cited by examiner

TRREN EXHAUST NOZZLE-M-SPIKE TURBO RAM ROCKET

FIELD OF THE INVENTION

An airbreathing and non-airbreathing aerospace propulsion system using used to accelerate a vehicle from ground level to orbital altitudes.

BACKGROUND OF THE INVENTION

The present invention is relating to an aerospace propulsion system. Aerospace propulsion systems of the future will operate over a larger speed regime than ever before, and will employ low drag techniques with as small a frontal structural area as possible, to minimize parasite drag. This will be achieved with this invention by morphing aerospace propulsion systems with an improved 2-stage air inlet system and a 3-position exhaust nozzle ring and port system. Geometry of the rings, ports, and spikes works to efficiently control subsonic and supersonic air flows and control shock waves.

This propulsion system provides thrust to an aerospace vehicle over a complete speed range from zero to hypersonic, and altitudes from ground level to earth orbit. This propulsion system employs rocket, turbine, exhaust nozzle, and air inlet systems that work together cohesively to control air flow, combustion gas flow, pressures, velocities, and shock waves to optimize propulsive efficiencies throughout a given vehicles entire flight envelope.

This invention introduces a unique combustion chamber arrangement, an air inlet assembly, an exhaust nozzle system called TRREN Exhaust Nozzle and M-Spike Rocket engine. The TRREN and M-spike systems are improvements to existing airbreathing and non-airbreathing combustion methods of propulsion by morphing techniques to control air flow, combustion gasses, and the position of shock waves, in an aerospace propulsion system. The 2-stage inlet system features active cooling to maintain low engine temperatures to prevent turbine overheating. The rocket functions as either a sole source of propulsion, at altitudes beyond airbreathing propulsion capabilities, or in a merged propulsion mode with the airbreathing system (s).

The turbine engine and rocket propulsion systems are oriented in a straight linear arrangement (as opposed to an adjacent side by side configuration) helping to keep a lower frontal cross-sectional area and associated lower drag coefficient.

SUMMARY

The components of this invention are utilized as a propulsion system in an aerospace vehicle and transform the methods of thrust in an enhanced arrangement throughout a flight to propel a given vehicle to orbital altitudes and velocities. The details of these embodiments are described and depicted in the accompanying illustrations and description.

BRIEF DESCRIPTION OF THE CROSS-SECTIONAL VIEW FIGURES

DETAILED DESCRIPTION OF THE EMBODIMENTS AND INVENTION

Figure 1:
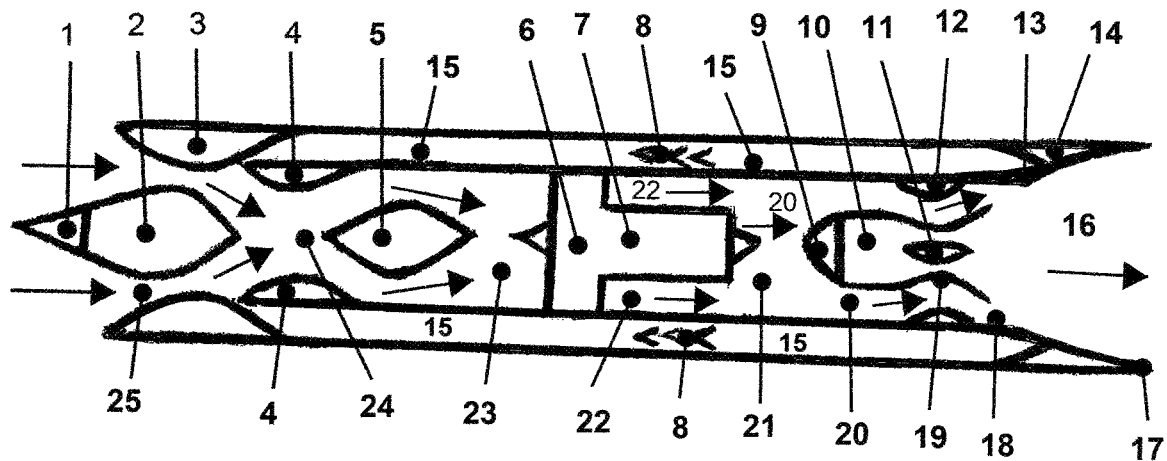
FIG. 1 illustrates the propulsion system including air inlet system, aft inlet ring in closed position and in turbofan propulsion mode, rocket engine with M-spike, and exhaust nozzle with TRREN turbine nozzle in the open position turbine propulsion mode.

This invention improves the function of existing airbreathing and non-airbreathing systems as a collective propulsion system FIG. 1. The components of the air-inlet systems forward inlet spike 2, spike tip 1, and forward inlet ring 3 form the primary means to control airflow and shock waves to the airbreathing propulsion system (s) throughout vehicle speeds.

Figure 3:
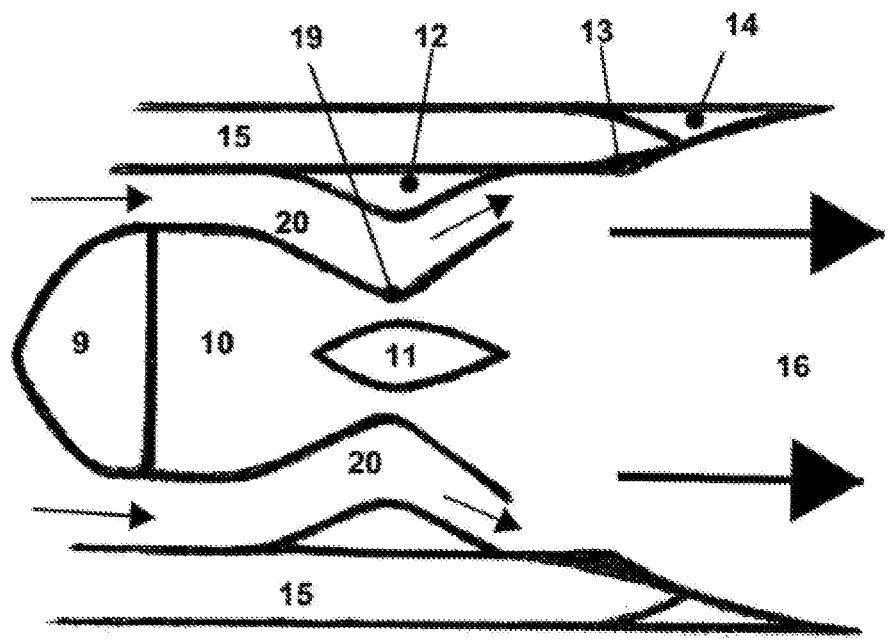
FIG. 3 illustrates the TRREN exhaust nozzle in the turbine propulsion mode with the turbine ring in the open position, and ramjet or scramjet ring in the closed position.

The turbojet or turbofan engine 6, 7, provide thrust for the aerospace vehicle from takeoff thru supersonic, and high supersonic speeds. During turbine propulsion mode, the TRREN turbine ring 12 is in the forward position (FIG. 3) opening turbine port 18 allowing fan discharge air 22 and core 7 combustion gas 21 from the compressor discharge air 21 to merge and flow thru the convergent duct section 20, to the divergent exhaust nozzle 13, 17 at supersonic flow velocity.

At high supersonic speeds and above, airflow to the turbine section 6, 7 is further controlled by the aft inlet ring 4 and aft inlet spike 5 as a second convergent to divergent duct 24, 23 configuration to maintain subsonic airflow velocities for entry to the turbojet or turbofan 6 and turbine core airflow 7. The reduction in flow velocity causes a corresponding increase in pressure at the aft spike that contributes to engine thrust.

Figure 8:
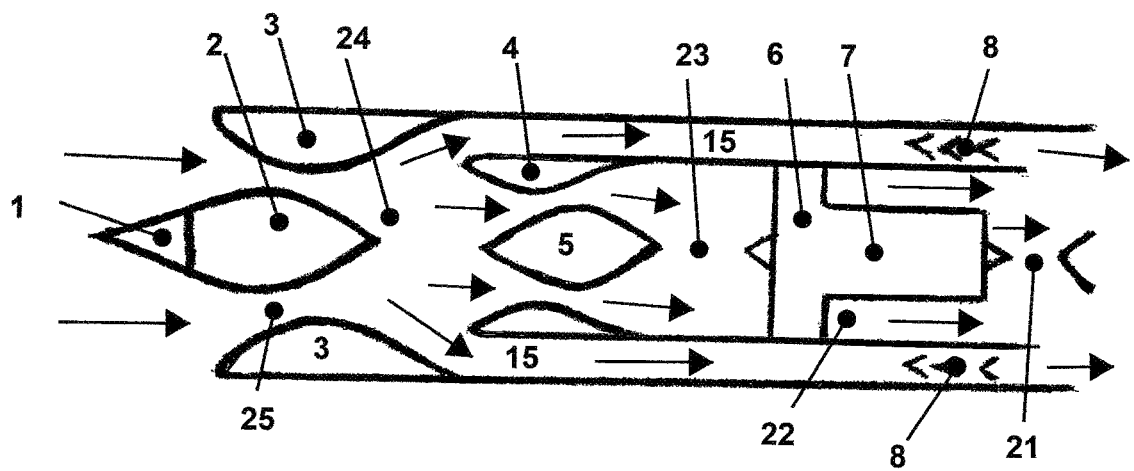
FIG. 8 illustrates the 2-stage air inlet system with aft inlet ring in open (aft) position and in turbo-ramjet/scramjet propulsion mode.
Figure 9:
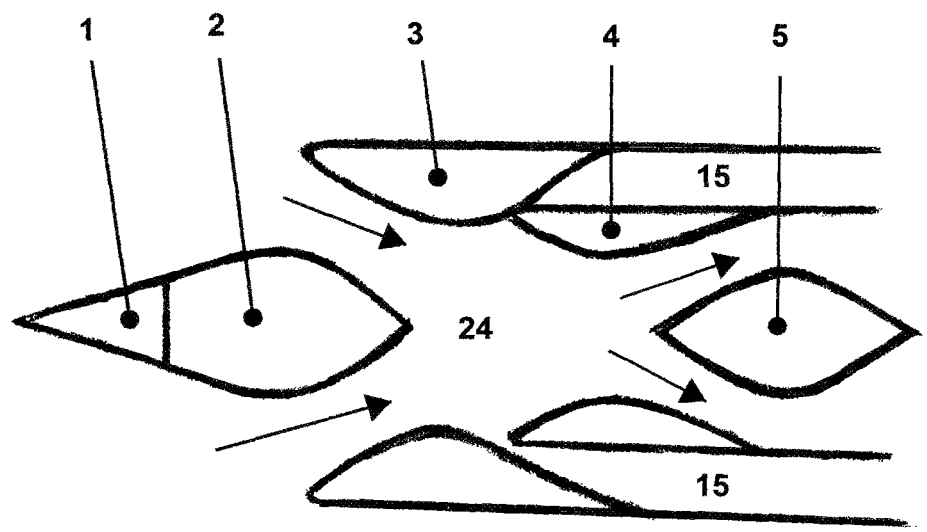
FIG. 9 illustrates the air inlet system with forward inlet spike in forward position and aft inlet ring in closed position in turbine propulsion mode.
Figure 10:
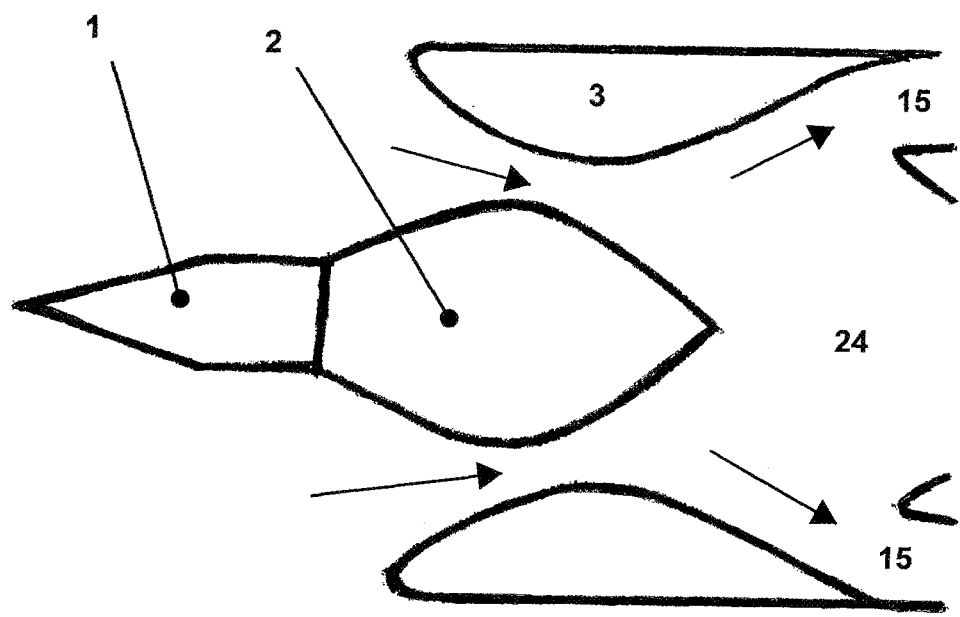
FIG. 10 illustrates the air inlet system with the spike tip of the forward inlet spike in the extended position.
Figure 11:
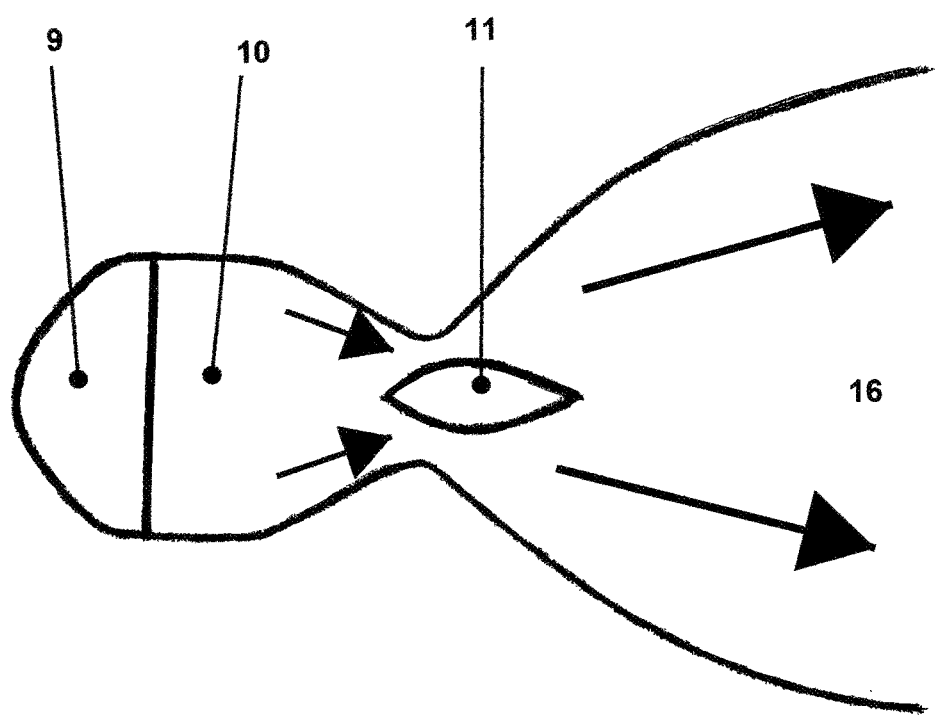
FIG. 11 illustrates the M-spike rocket engine as an independent propulsion engine without the TRREN exhaust nozzle.

As the vehicle airspeed increases thru supersonic (to high supersonic) the spike tip 1 extends or retracts as required (FIGS. 9, 10) to control the location of the shock cone at or in the inlet 25. The aft inlet ring 4 translates to a downstream position opening the turbine bypass duct 15 (FIG. 8) allowing airflow to the ramjet or scramjet burner 8 and fuel flows to the ramjet or scramjet fuel manifold 8 for combustion.

Figure 4:
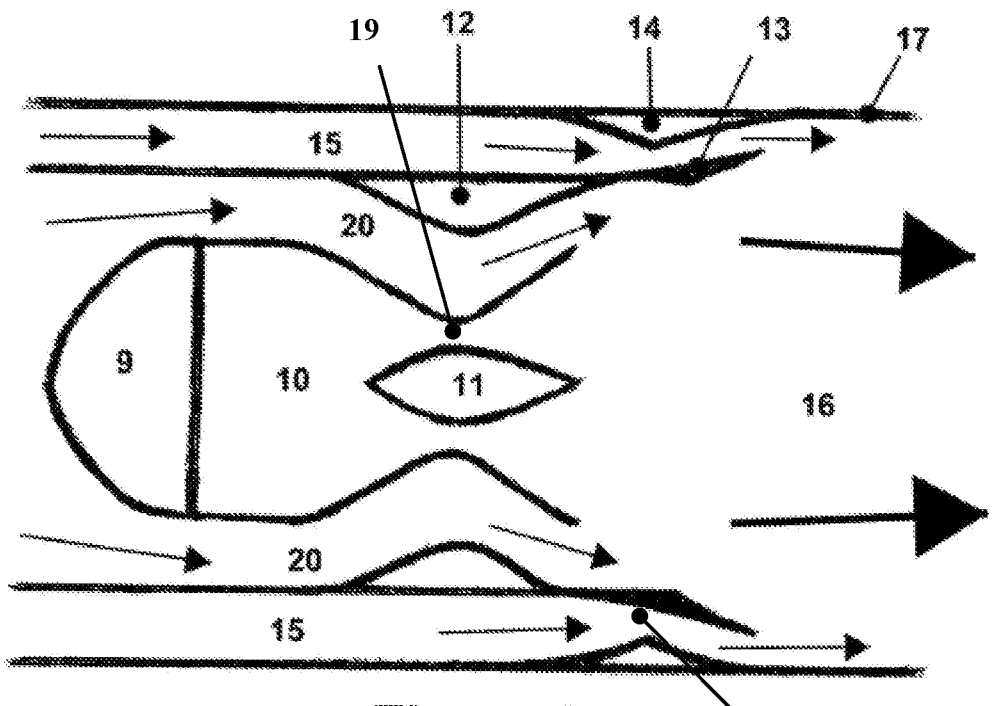
FIG. 4 illustrates the TRREN exhaust nozzle in the turbo-ram propulsion mode, with both the turbine exhaust ring, and the ram exhaust ring in the open-forward positions.

Fuel flows through the cooling channels in the aft inlet spike 5 and ring 4 to maintain turbine inlet temperatures within engine tolerance range. As the aft inlet ring 4 moves to open position, the ramjet or scramjet exhaust ring 14 translates forward to open the ramjet or scramjet port 26 allowing ramjet or scramjet flow into the TRREN exhaust nozzle (FIG. 4). The ramjet or scramjet 8 propulsion system engage seamlessly to provide thrust for the vehicle.

The downstream position of the aft inlet ring 4 allows airflow to be divided between the turbine engine 6, 7 and ramjet or scramjet 8 flow thru the turbine bypass duct 15 for simultaneous propulsion. The convergent to divergent duct configuration 24, 23 of the aft inlet ring 4 and spike 5 allows the turbine engine to contribute to propulsion with the ramjet or scramjet 15 modes at high supersonic and low hypersonic vehicle speeds. The two-stage convergent to divergent duct system works to improve flow control for the airbreathing system and allow the turbine section to contribute to vehicle thrust at higher vehicle speeds, as active cooling methods maintain acceptable core temperature levels.

Figure 2:
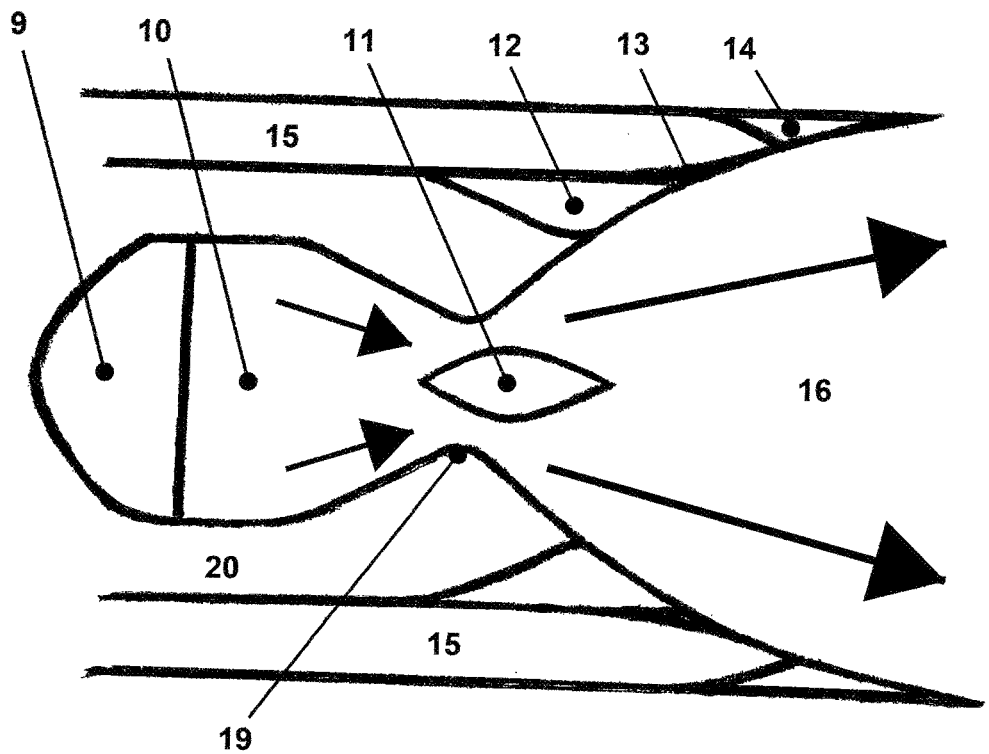
FIG. 2 illustrates the TRREN exhaust nozzle and M-spike rocket engine in full rocket mode with both TRREN rings in closed-aft positions, and the M-spike in the aft position.
Figure 5:
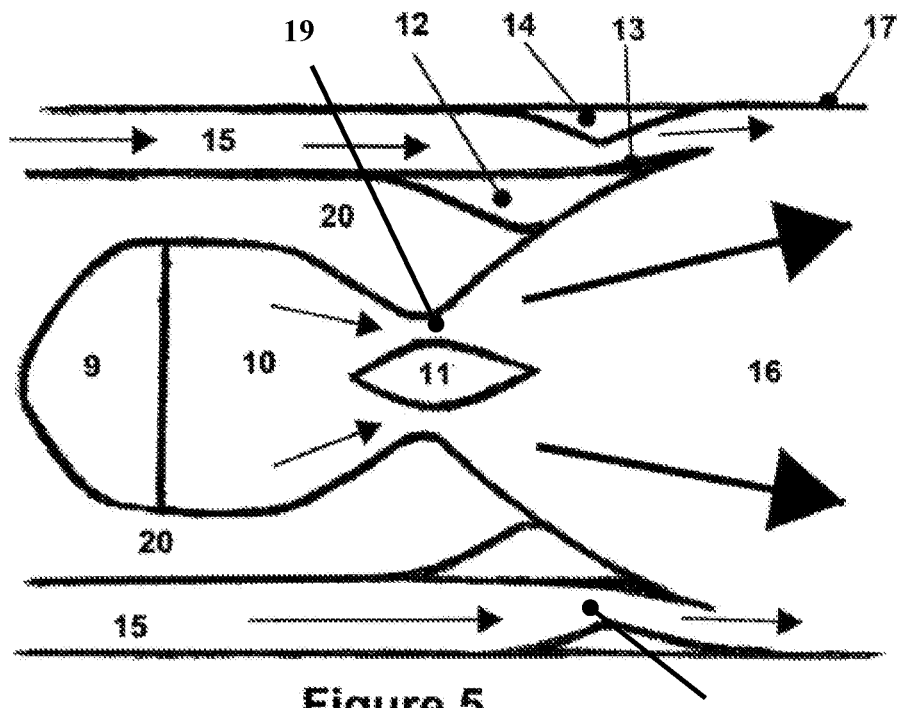
FIG. 5 illustrates the TRREN exhaust nozzle in the ram-rocket mode with ram exhaust ring in the open-forward position, the turbine exhaust ring in the closed-aft position, and M-spike in the center position
Figure 6:
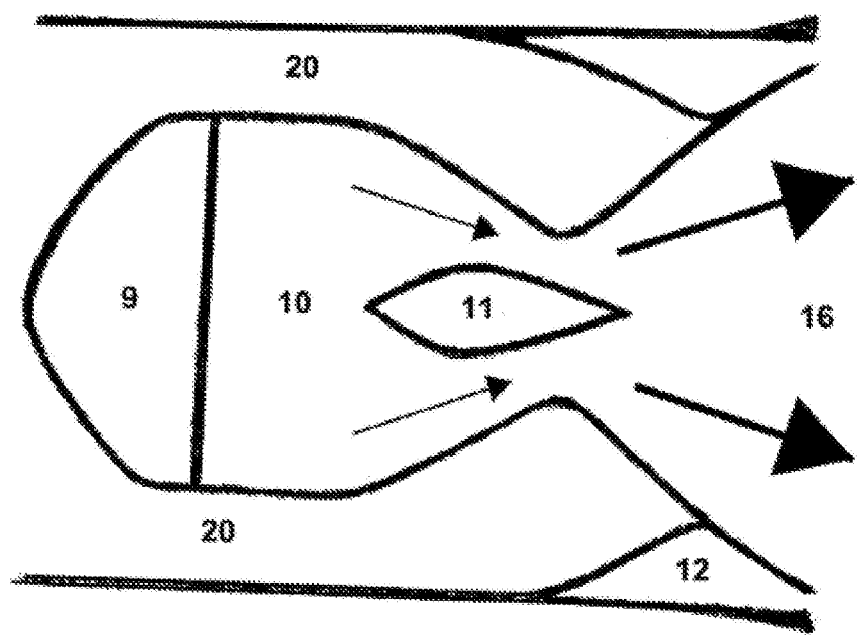
FIG. 6 illustrates the M-spike rocket with the spike in the forward position to provide optimum control with nozzle operating conditions in under-expanded or over expanded conditions.
Figure 7:
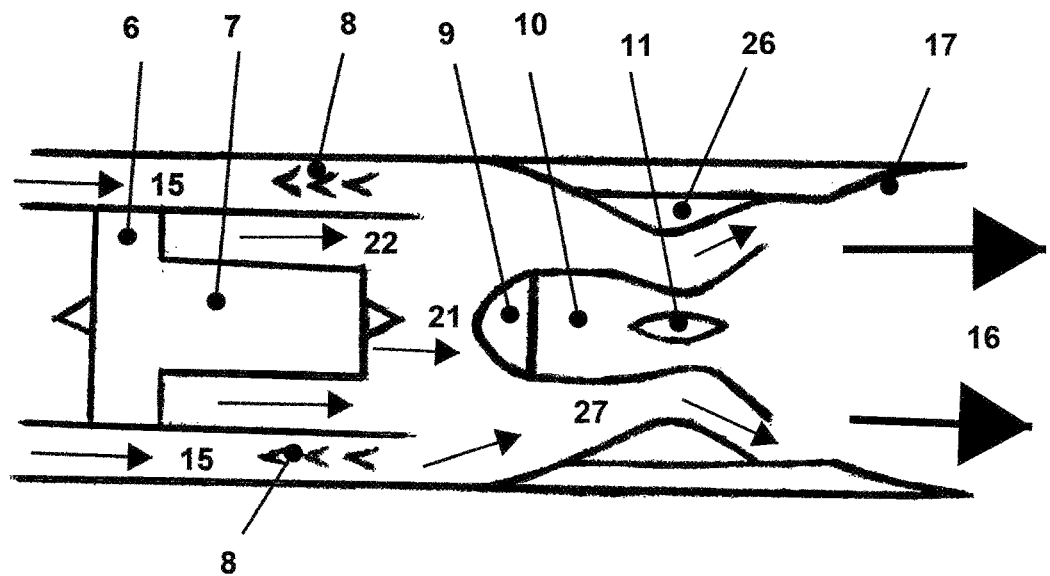
FIG. 7 illustrates the propulsion system TRREN exhaust nozzle with a single ring as a turbo-ramjet exhaust ring in the open position, turbine section, ram burner and duct, and M-spike rocket.

As the vehicle accelerates from high supersonic to hypersonic, the aft inlet ring 4 moves full aft to close the convergent to divergent 24, 23 duct, and the turbine exhaust ring 12 moves to aft closed position (FIG. 5). Rocket fuel flows through cooling channels in the M-spike 11, and combustion chamber 10 walls to control temperature, fuel and oxidizer flow to the intake manifold 9 into the rocket combustion chamber 10 for combustion, and the non-air breathing rocket 10 ignites and provides propulsion thru to orbital altitudes. As vehicle speed and altitude increase, the M-spike 11 translates forward or aft in the throat 19 (FIGS. 5, 6) as required to control and focus the combustion flow, shock waves, and improve exhaust nozzle 13, 17 efficiencies in over-expanded or under-expanded rocket operation. Movement of the M-spike 11 functions to control the flow of exhaust gas, and improve throttling capabilities through a wide range of flow rates. As altitude increases, the ram exhaust ring 14 moves aft to closed position (FIG. 2), and the aft inlet ring 4 moves to forward closed position (FIG. 9) and close the turbine bypass duct 15 for full rocket propulsion mode

What is claimed:

1. An aerospace propulsion system comprising:
   an air inlet mechanism, further comprising a movable forward inlet spike, a movable forward inlet spike tip, a forward inlet ring, a movable aft inlet spike and a movable aft inlet ring, and a cooling channel in both said aft inlet spike and the aft inlet ring,
   an airbreathing turbine system, comprising a turbojet or turbofan, and further comprising a convergent duct, a combustion fuel, wherein the cooling channel of both the aft inlet spike and the aft inlet ring function as a mechanism for temperature control of said airbreathing turbine system,
   an airbreathing ramjet or scramjet system, further comprising an annular turbine bypass duct, a burner, a fuel manifold, wherein said ramjet or scramjet system shares said air inlet mechanism with said airbreathing turbine system,
   a non-airbreathing rocket system located downstream of the airbreathing turbine system, arranged along a center axis of said aerospace propulsion system, further comprising a fuel system and an oxidizer system, an intake manifold, a combustion chamber and a throat, having a movable spike located within said throat area, and a cooling channel in both said combustion chamber and the movable spike, wherein the cooling channel in both the combustion chamber and the movable spike function as a mechanism for temperature control of the non-airbreathing rocket system,
   a turbo ram rocket exhaust nozzle located downstream of the non-airbreathing rocket system, wherein is a divergent exhaust nozzle, and further comprising a moveable turbine exhaust ring corresponding to said turbine system, and a turbine port corresponding to said turbine system, a moveable ramjet or scramjet exhaust ring corresponding to said ramjet or scramjet system, and a ramjet or scramjet port corresponding to said ramjet or scramjet system; wherein said airbreathing ramjet or scramjet system, the airbreathing turbine system, and the non-airbreathing rocket system are connected to each other as a single structure.

2. The aerospace propulsion system of claim 1, wherein combustion gas from said airbreathing turbine system, the airbreathing ramjet or scramjet system, and the non-airbreathing rocket system merge into the divergent exhaust nozzle of said turbo ram rocket exhaust nozzle.

3. The aerospace propulsion system of claim 1, wherein the airbreathing turbine system, is located along the center axis of the aerospace propulsion system, with the airbreathing ramjet or scramjet system located circumferentially around the airbreathing turbine system, such that said airbreathing turbine system and said airbreathing ramjet or scramjet system produces thrust independently of each other or simultaneously.

4. The aerospace propulsion system of claim 1, wherein said moveable spike of the non-airbreathing rocket system translates forward into the combustion chamber of said non-airbreathing rocket system and aft into the divergent exhaust nozzle of the turbo ram rocket exhaust nozzle.

5. The aerospace propulsion system of claim 4, wherein translation of said moveable spike of the non-airbreathing rocket system, controls the cross-sectional area in the throat of said non-airbreathing rocket combustion chamber, such that exhaust flow is supersonic entering said divergent exhaust nozzle of the turbo ram rocket exhaust nozzle.

6. The aerospace propulsion system of claim 1, wherein the turbine exhaust ring and the ramjet or scramjet exhaust ring translate aft such that the turbine port and the ramjet or scram jet port close, wherein the non-airbreathing rocket system provides sole propulsion independently of the airbreathing turbine system, and the airbreathing ramjet or scramjet system.

7. The aerospace propulsion system of claim 1, wherein said turbine exhaust ring and said ramjet or scramjet exhaust ring, translate forward, wherein the turbine port and the ramjet or scramjet port open, wherein supersonic combustion gas flow enters the turbo ram rocket exhaust nozzle, wherein merged propulsion is produced from said airbreathing turbine system, and said airbreathing ramjet or scramjet system and said non-airbreathing rocket system.

8. The aerospace propulsion system of claim 1, wherein said aft inlet spike, and the aft inlet ring of said air inlet mechanism translate to an open or a closed position and function as a second convergent to divergent duct, wherein the airbreathing turbine system contributes to propulsion with the airbreathing ramjet or scramjet system due to translation of the aft inlet ring and the aft inlet spike.

9. The aerospace propulsion system of claim 8, wherein the aft inlet ring translates downstream to open said turbine bypass duct, wherein subsonic or supersonic air flow to said ramjet or scramjet system, wherein airflow to the airbreathing turbine system is further controlled by the cooling channels in the aft inlet spike and the aft inlet ring to control cooling of the airbreathing turbine system during ramjet or scramjet operation.

\* \* \* \* \*